Jan. 6, 1970  C. G. MONTANA  3,487,744
LICENSE PLATE FASTENER
Filed Feb. 23, 1968

INVENTOR:
CHARLES G. MONTANA 3,487,744
LICENSE PLATE FASTENER
Charles G. Montana, Rockford, Ill., assignor of one-half to Joseph D. Bove, Rockford, Ill.
Filed Feb. 23, 1968, Ser. No. 707,830
Int. Cl. F16b 35/04
U.S. Cl. 85—3                                                              8 Claims

ABSTRACT OF THE DISCLOSURE

This fastener is designed for easier application and easier removal than existing fasteners while giving dependable performance so as not to loosen accidentally, and leave the plate unfastened. The spring action butterfly assembly is held closed inside the spring until entered through registering slots in the plate and its support, when it spreads out to secure the plate, the spring meanwhile being compressed between the plate and the back of the reflector. The latter can then be turned to tighten the screw that threads in a nut in the butterfly assembly, so the spring is further compressed making the resilient fastening more secure. Removal requires only loosening of the screw enough to enable pulling the fastener out. The spring tension in the assembly eliminates likelihood of the screw loosening with vibration. A loop on the outer end of the spring receives the screw to retain the spring on the assembly, and the inner end of the screw is upset to prevent its being unscrewed from the nut.

---

This invention relates to license plate fasteners and has for its principal object the provision of what is virtually a three-part, simple, economical, fastener assembly that is:

(1) Easy to apply;
(2) Easy to remove, and
(3) Dependable for the purposes contemplated, while at the same time furnishing a pair of colored reflectors on each license plate for an added safety feature.

The invention is illustrated in the accompanying drawings in which.

The same reference numerals are applied to corresponding parts throughout the views.

Figure 1:
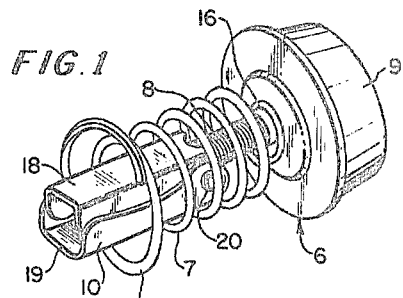
FIG. 1 is a perspective view of the license plate fastener assembly as it appears before it is applied.
Figure 2:
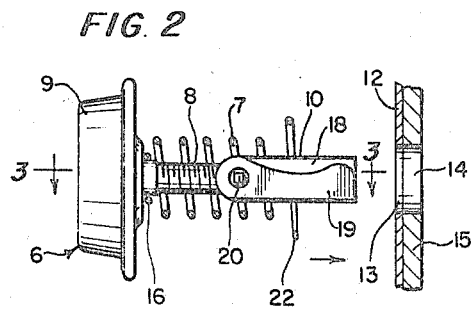
FIG. 2 is a side view with the spring shown in section to better illustrate the construction, and showing also the slotted portion of a license plate and its supporting bracket or plate to indicate the ease of entry in the registering slots when fastening the license plate.
Figure 3:
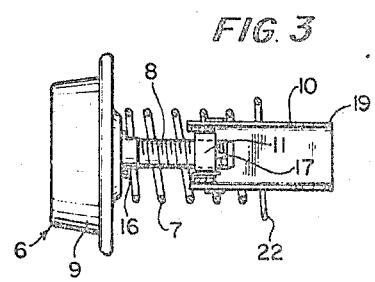
FIG. 3 is a sectional view on the line 3—3 of FIG. 2.

The license plate fastener of my invention, indicated generally by the reference numeral 6, consists essentially of only three parts, namely, the coiled compression spring 7, the screw 8 with the reflector button 9 on its outer end, and the spring tensioned butterfly assembly 10. The later serves as an anchor means and is assembly by means of its nut 11 on the screw 8 and prior to application to a license plate, a slotted portion of which is shown at 13 in FIGS. 2 and 4, with the slot 13 in register with a slot 14 in the license plate support, bracket or plate 15, is maintained in its closed or folded condition inside the spring 7, as seen in FIGS. 1, 2, and 3. The spring 7 is maintained in assembled relation to the other parts by means of a loop 16 of smaller diameter than the rest of the spring provided on the outer end thereof and receiving the screw 8, this loop being retained between the nut 11 and the reflector 9 so that the spring cannot slip off and be lost or mislaid. For similar reasons, the inner end of the screw 8 is upset, as indicated at 17, so that the nut 11 cannot be backed off the screw if someone should thoughtlessly unscrew the screw 8 from the nut prior to using the fastener to fasten the license plate. In other words, the assembly is foolproof, and, since it is impossible to lose any of the parts of the assembly, this license plate fastener can be used over and over again. As will now be pointed out, it is designed so that it is very easily applied to a license plate and its supporting bracket.

Figure 4:
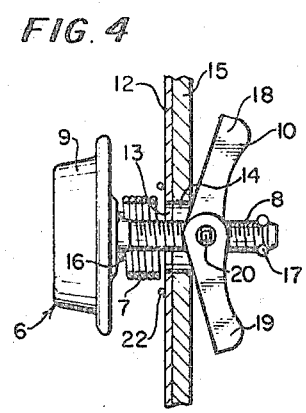
FIG. 4 is a section related to FIG. 2, but showing the license plate fastener applied.
Figure 5:
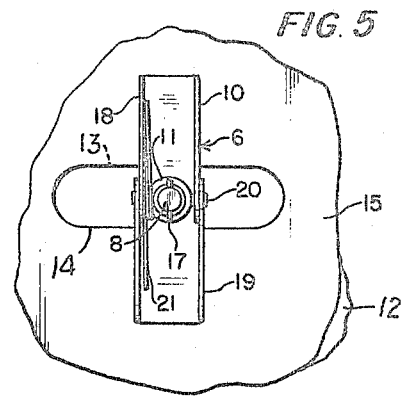
FIG. 5 is an inner end view of FIG. 4.

In operation, it will be understood that the wings 18 and 19 are pivoted on the trunnions 20 extending in diametrically opposed relationship from the nut 11 and that they are normally urged apart by the conventional grasshopper spring 21 that surrounds one of the trunnions 20 on one side of the nut 11 and has its two arms engaged in the channels of the two wings 18 and 19 to spread them apart when the wings are free to swing from the normally closed condition shown at FIGS. 1 and 2 to the wide open condition shown in FIGS. 4 and 5. The coils intermediate the ends of the spring 7 are small enough in diameter in relation to the folded butterfly assembly 10 to hold it closed without any effort on the part of the user when inserting the ends of the wings 18 and 19 through the registering slots 13 and 14 as indicated in FIG. 2 in applying the fastener. The spring 7 meanwhile is being compressed between the plate 12 and the back of the reflector 9. The wings 18-19 of the butterfly assembly spread out behind the support 15 to serve as an anchor means for the plate, and then the reflector 9 is turned to tighten the screw 8 for further compression of the spring, making the resilient fastener even more secure. Removal of the fastener requires only sufficient loosening of the screw to enable pulling the fastener out. The spring tension in the fastener assembly eliminates any likelihood of rattling and also any likelihood of the screw 8 loosening with vibration. The loop 16 on the outer end of the spring loosely receives the screw 8 to retain the spring on the fastener assembly before it is used, and the inner end of the screw 8 is upset as seen at 17 to prevent its being unscrewed from the nut 11. By making the coils 22 at the inner end of the spring 7 of enlarged diameter, I am assured of keeping the last coil from ever engaging in the slots 13-14 and also provide a much wider seat for the spring on the plate 12 around the slot 13.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. A resilient fastener for license plates, comprising a butterfly anchor assembly having a nut in the middle portion thereof relative to which a pair of spring-action wings are spreadable from closed substantially parallel condition to spread substantially aligned relation for anchoring action to serve as a retaining anchor means, a screw threaded at one end in said nut and having a head on the other end that is enlarged to serve as a manually operable knob and as an abutment for one end of a coiled compression spring, and a coiled compression spring surrounding the butterfly assembly disposed with its wings arranged to open outwardly away from the head of the screw serving to hold its wings closed temporarily against its built-in spring action that tends to spread the same to its spread anchoring condition, said spring by tightening of said screw being compressible between the head of said screw and a license plate through an opening in which the wings of the butterfly assembly in closed condition have been entered in a fastening operation.

2. A resilient fastener as set forth in claim 1, including means for preventing endwise displacement of said spring off said butterfly assembly in its closed condition.

3. A resilient fastener as set forth in claim 1, wherein said spring has a loop on its outer end receiving said screw to maintain the spring in a position holding the wings of said butterfly assembly closed prior to application of the fastener.

4. A resilient fastener as set forth in claim 1, wherein said spring has a loop on its outer end receiving said screw to maintain the spring in a position holding the wings of said butterfly assembly closed prior to application of the fastener, the other end of said spring being of enlarged diameter for a broader base of engagement on the part through an opening in which the wings of said butterfly assembly have been entered in a fastening operation.

5. A resilient fastener as set forth in claim 1, wherein the inner end of said spring remote from the head end of said screw is of enlarged diameter for a broader base of engagement on the part through an opening in which the wings of the butterfly assembly have been entered in a fastening operation.

6. A resilient fastener as set forth in claim 1, wherein the end of said screw remote from the head has a shoulder provided thereon positively limiting unscrewing of the screw relative to said nut.

7. A resilient fastener as set forth in claim 1, wherein the head of the screw includes a reflector of enlarged diameter in relation to said compression spring.

8. A resilient fastener as set forth in claim 1, wherein said coiled compression spring when not compressed is of such a length in relation to the rest of the parts of the resilient fastener assembly when surrounding the butterfly assembly holding its wings closed that the end portions of the wings protrude for easy insertion through the slot in a license plate and the registering slot in a plate support.

References Cited

UNITED STATES PATENTS

| | | |
|---|---|---|
| 1,153,797 | 9/1915 | Kegreisz. |
| 1,271,763 | 7/1918 | Poole. |
| 2,204,871 | 12/1935 | Parsons. |
| 2,224,023 | 12/1940 | Sayen et al. _____ 85—3 |
| 2,840,398 | 6/1958 | Chapellier _____ 85—3 |

FOREIGN PATENTS

| | | |
|---|---|---|
| 780,499 | 8/1957 | Great Britain. |

MARION PARSONS, JR., Primary Examiner